United States Patent [19]

Sato

[11] Patent Number: 5,281,876
[45] Date of Patent: Jan. 25, 1994

[54] MINIATURE MOTOR
[75] Inventor: Makoto Sato, Matsudo, Japan
[73] Assignee: Mabuchi Motor Co., Ltd., Chiba, Japan
[21] Appl. No.: 867,756
[22] Filed: Apr. 13, 1992
[30] Foreign Application Priority Data Apr. 16, 1991 [JP] Japan .................. 3-25151[U]

[51] Int. Cl.5 .................. H02K 11/00; H02K 13/00
[52] U.S. Cl. .................. 310/40 MM; 310/71; 361/104
[58] Field of Search .................. 310/40 MM, 71, 249; 361/104

[56] References Cited

U.S. PATENT DOCUMENTS 3,886,408  5/1975  Klayum et al. .................. 361/56
4,638,203  1/1987  Maki et al. .
4,845,393  7/1989  Burgess et al. .................. 310/51
4,873,464  10/1989  Wang .
5,015,896  5/1991  Wong .
5,043,619  8/1991  Kartman, Jr. .

FOREIGN PATENT DOCUMENTS 0098859  6/1985  Japan .................. 310/40 MM

Primary Examiner—Emanuel T. Voeltz
Assistant Examiner—Judson H. Jones
Attorney, Agent, or Firm—McGlew and Tuttle

[57] ABSTRACT

A miniature motor comprising a case formed of a metallic material into a bottomed hollow cylindrical shape on the inner circumferential surface of which a permanent magnet is fixedly fitted, a rotor consisting of an armature facing the permanent magnet and a commutator, a case cover fitted to the opening of the case, and having brushes for making sliding contact with the commutator and input terminals electrically connected to the brushes; the rotor being rotatably supported by bearings provided on the bottom of the case and the case cover, in which electronic components are inserted in series between a pair of the input terminals via spring members made of an electrically conductive material.

5 Claims, 2 Drawing Sheets

MINIATURE MOTOR

FIELD OF THE INVENTION

This invention relates generally to a miniature motor used for audio equipment, video equipment and automotive electrical equipment, and more particularly to an easy-to-assemble miniature motor having high resistance to vibration, impact, etc. and high reliability with respect to electrical connection.

BACKGROUND OF THE INVENTION

FIG. 1 is a partially sectional side view illustrating an example of miniature motors to which this invention is applied. In FIG. 1, reference numeral 31 refers to a case formed of a metallic material, such as mild steel, into a bottomed hollow cylindrical shape, to the inner circumferential surface of which a permanent magnet of an arc-segment shape, for example, is fixedly fitted. Numeral 33 refers to a case cover formed of a thermoplastic resin material in such a manner as to fit to the opening of the case 31. Numeral 34 refers to a rotor consisting of an armature 35 facing the permanent magnet 32, and a commutator 36, and rotatably supported by bearings 37 and 38 each provided on the case 31 and the case cover 33.

Numeral 39 refers to a brush arm formed of an electrically conductive material into a strip shape, having a brush 40 for making sliding contact with the commutator 36, and provided in the case cover 33. In the case cover 33, also provided is an input terminal 41 for electrically connecting the brush arm 39 so that power can be fed from an external d-c source to the armature 35 via the brush arms 39, the brushes 40 and the commutator 36.

As current is fed to the armature 35 of a miniature motor of the above-mentioned construction, rotating force is generated in the armature 35 existing in a magnetic field formed by the permanent magnet 32 fixedly fitted to the inner circumferential surface of the case 31, and thus the rotor 34, and various equipment connected to the rotor 34 are caused to rotate.

In the miniature motor as described above, a capacitor, as shown in FIGS. 2 and 3, is usually installed to reduce electrical noise. In FIGS. 2 and 3, like parts are indicated by like numerals shown in FIG. 1. FIG. 2 shows an example in which a capacitor 42 is connected across input terminals 41 and 41 via lead wires 43. FIG. 3, on the other hand, shows an example in which capacitors 42 are installed on the inside surface of the case cover 33; one lead wire 43a of the capacitor 42 being connected to the input terminal 41, and the other lead wire 43b to a case 31 made of a metallic material.

The example shown in FIGS. 2 and 3, however, involve extremely complex and troublesome operations to connect the lead wires 43, 43a and 43b to the input terminal 41 or the case 31. That is, soldering operations associated with electrical connections, and operations of placing and cutting the lead wires 43, 43a and 43b require a certain degree of skill, leading to increased time and manhours, and to increased manufacturing cost accordingly. Furthermore, soldering in a limited space tends to make connections between members quite unstable, resulting in vulnerability to vibration, impact, etc. during service, and in inadequate reliability in terms of electrical connection.

SUMMARY AND OBJECTS OF THE INVENTION

It is the first object of this invention to provide a miniature motor having such a construction as to facilitate the installation of capacitors and other electronic components.

It is the second object of this invention to provide a miniature motor having high reliability in terms of electrical connection between components.

DETAILED DESCRIPTION OF THE EMBODIMENTS

Figure 1:
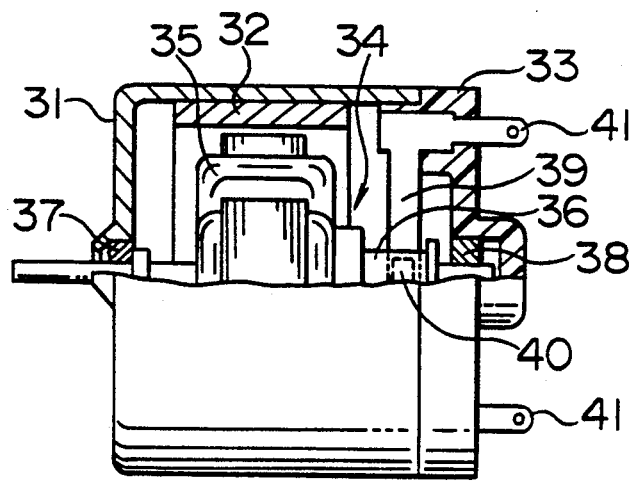
FIG. 1 is a partially sectional side view of an example of miniature motor to which this invention is applied.
Figure 2:
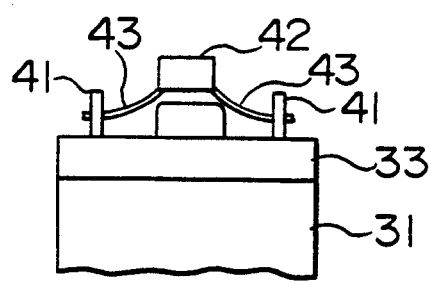
FIG. 2 is a side view illustrating the essential part of an example of miniature motor of a conventional type in which a capacitor is installed.
Figure 3:
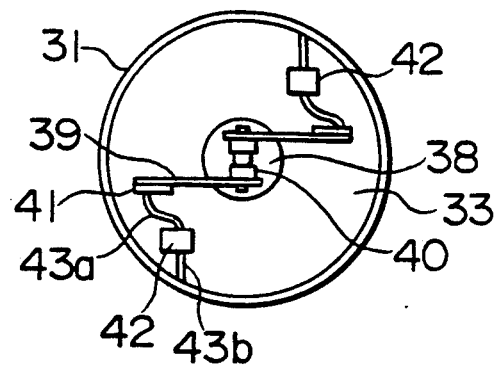
FIG. 3 is an inside end view illustrating the essential part of another example of miniature motor of a conventional type in which capacitors are installed.
Figure 4:
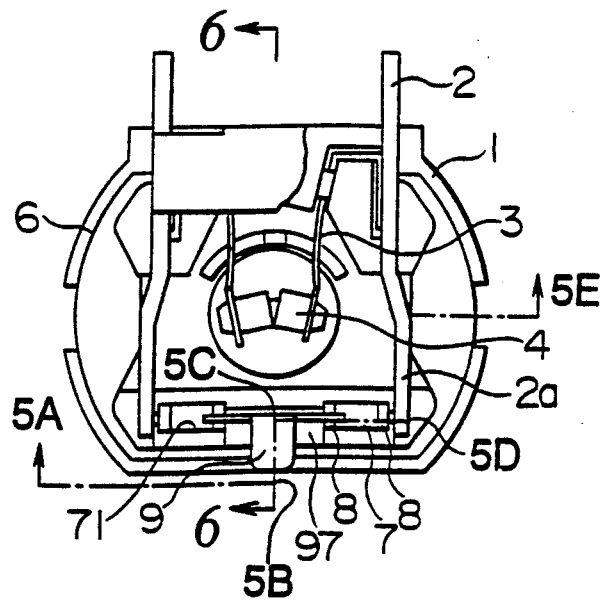
FIG. 4 is an inside end view illustrating the case cover of a miniature motor embodying this invention.
Figure 5:
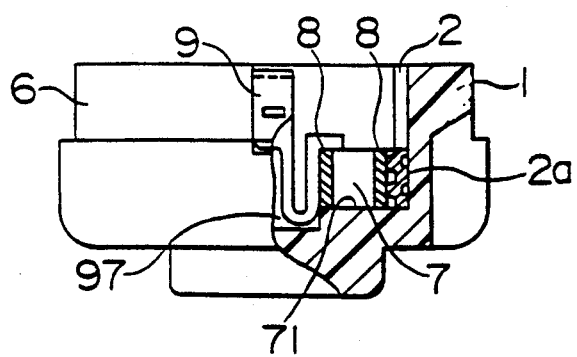
FIG. 5 is a sectional view taken along line 5A-5B-5C-5D-5E in FIG. 4.
Figure 6:
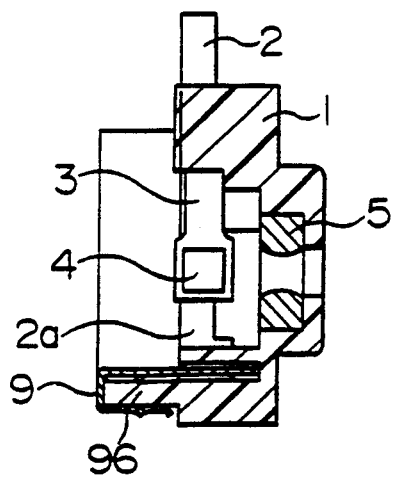
FIG. 6 is a sectional view taken along line 6—6 in FIG. 4.

FIG. 4 is an inside end view illustrating a case cover in a miniature motor embodying this invention. FIGS. 5 and 6 are sectional views taken along line 5A-5B-5C-5D-5E and line 6—6 in FIG. 4, respectively. In FIGS. 4 through 6, numeral 1 refers to a case cover formed of a thermoplastic resin material into an essentially cup shape, and having a pair of input terminals 2 and a pair of brush arms 3. Numeral 4 refers to a brush fixedly fitted to a free end of a brush arm 3. The input terminal 2 is electrically connected to the brush arm 3. Numeral 5 refers to a bearing, and 6 to a case engaging portion having an outside diameter and shape corresponding to the inside diameter and shape of a case (not shown. Refer to numeral 31 in FIGS. 1 through 3.)

Numeral 7 refers to a capacitor placed in a housing space 71 provided in the case cover 1, and disposed so as to make contact with the extended part 2a of the input terminal 2 via an electrode 8. Numeral 9 refers to a spring member made of an electrically conductive material and disposed in such a manner as to force or hold the capacitor 7 on the extended part 2a of the input terminal 2 via the electrode 8 in the housing space 97, as will be described later. The spring member 9 is disposed in such a manner that the spring member 9 is partially exposed to the outer circumferential surface of the case cover 1, for example, so that the spring member 9 is electrically connected to a case (not shown), made of a metallic material, when the case cover 1 is engaged with the case.

Figure 7:
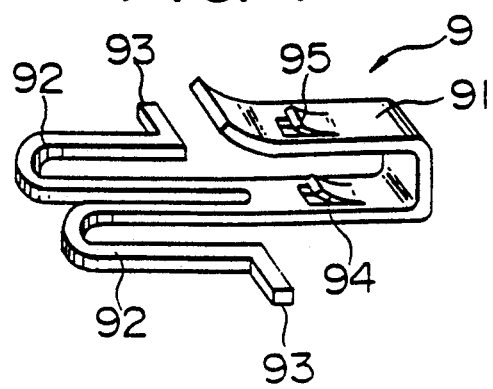
FIG. 7 is an enlarged perspective view illustrating a spring member in FIGS. 4 through 6.

FIG. 7 is an enlarged perspective view illustrating the spring member 9 shown in FIGS. 4 through 6. In FIG. 7, the spring member 9 is made of an electrically conductive strip or hoop material, and consists of an essentially U-shaped holder portion 91, an essentially W-shaped spring portion 92 formed by extending and bifurcating one leg of the holder portion 91, and a retainer portion 93 formed on a free end of the spring portion 92.

Numeral 94 indicates an engaging portion provided on the holder portion 91, which protrudes from the surface of the holder portion 91 so as to engage with the support portion 96 on the case cover 1 when the spring member 9 is fitted to the case cover 1, as shown in FIG. 6. Numeral 95 indicates an earth portion which protrudes so as to make contact with the inside surface of the case when the case cover 1 is fitted to the case. The holder portion 91 and the spring portion 92 are formed in an elastically deformable manner.

With the above construction, the capacitor 7 is housed in the housing space 71 and the electrodes 8 and 8 are caused to make contact with both sides of the capacitor 7; one electrode 8 being disposed in such a manner as to make contact with the extended part 2a of the input terminal 2, as shown in FIGS. 4 through 6. Then, the capacitor 7 is fixedly fitted by inserting the spring member 9 between the electrodes 8 and 8. That is, the holder portion 91 as shown in FIG. 7 holds part of the support portion 96 of the case cover 1, and the spring portion 92 forces the capacitor 7 onto the extended part 2a of the input terminal 2 via the electrodes 8 and 8 to ensure electrical connection. In this state, the retainer portion 93 pushes the capacitor 7 in the axial direction of the case cover 1 to securely fix the capacitor 7. The engaging portion 94 and the earth portion 95 provided on the holder portion 91 of the spring member 9, both of which are formed in the above-mentioned manner, can tightly hold the spring member 9 and secure electrical connection with the case.

In this embodiment, description has been made on an example where a capacitor as an electronic component is fitted to the miniature motor, but the same effects can be achieved even when coils, resistors and other electronic components are fitted to the miniature motor. Needless to say, the amount of elastic deformation, holding force and repulsion force to be imparted to the holder portion and spring portion of the spring member should be selected appropriately taking into account the specifications of the motor and electronic components to which this invention is applied.

Since this invention has the aforementioned construction and operation, electronic components can be positively incorporated into the miniature motor merely by forcing the spring member onto the case cover. This makes assembly operation easy, leading to reduced manufacturing cost. In addition, since the electronic components are fixedly fitted by the elastic deformation of the spring member, the electronic components have high resistance to vibration and impact, and maintain good electrical connection. This leads to improved reliability of the miniature motor.

What is claimed is:
1. A miniature motor comprising a case formed of a metallic material into a bottomed hollow cylindrical shape, having a permanent magnet on the inside circumferential surface thereof; a rotor having an armature facing said permanent magnet and a commutator; and a case cover engaging with the opening of said case and having brushes for making sliding contact with said commutator, and input terminals for electrically connecting said brushes; said rotor being rotatably supported by bearings provided on the bottom of said case and said case cover, characterized in that electronic components are installed in series between a pair of input terminals via a spring member made of an electrically conductive material, said spring member being formed integrally by connecting a U-shaped holder portion and a W-shaped spring portion; said holder portion being engaged with said case cover, and a capacitor being held between said spring portion and said input terminals.

2. A miniature motor as set forth in claim 1 wherein said spring member and a housing space for housing electronic components are provided inside case cover, adjoining each other.

3. A miniature motor comprising:
a rotor including an armature and a commutator;
a case surrounding a portion of said rotor, said case including a case bearing means for rotatably supporting an end of said rotor, said case also including a permanent magnet positioned on an inside of said case and adjacent said armature, said case defining a case opening;
a case cover engaging with said case opening and having cover bearing means for rotatably supporting another end of said rotor, said case cover including brush means for making sliding contact with said commutator, and also including input terminal means for electrically connecting said brush means;
a spring member integrally formed of electrically conductive material by connecting a U-shaped holder portion and a W-shaped spring portion, said holder portion being engaged with said case cover;
an electrical component held between said spring portion and said input terminal means.

4. A motor in accordance with claim 3, wherein:
said case cover defines a housing space for housing said electrical component, and said spring member and said housing space are positioned adjacent each other inside said case cover.

5. A motor in accordance with claim 3, wherein:
said electrical component is a capacitor.

* * * * *